(12) United States Patent
Tanaka et al.

(10) Patent No.: US 11,727,390 B2
(45) Date of Patent: Aug. 15, 2023

(54) WALLET SERVER, WALLET SYSTEM, AND NON-TRANSITORY STORAGE MEDIUM

(71) Applicant: TOYOTA JIDOSHA KABUSHIKI KAISHA, Toyota (JP)

(72) Inventors: Yurika Tanaka, Yokosuka (JP); Hideo Hasegawa, Nagoya (JP); Nozomu Yoshioka, Kasugai (JP); Tsuyoshi Takeshita, Nagoya (JP); Shoichiro Suzuki, Tokyo (JP); Kohei Ichihara, Machida (JP); Shota Yamamoto, Tokyo (JP); Junya Chikanishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/337,892

(22) Filed: Jun. 3, 2021

(65) Prior Publication Data

US 2021/0383362 A1   Dec. 9, 2021

(30) Foreign Application Priority Data

Jun. 9, 2020   (JP) .................................. 2020-100081

(51) Int. Cl.
*G06Q 20/00* (2012.01)
*G06Q 20/36* (2012.01)
*G06K 7/14* (2006.01)

(52) U.S. Cl.
CPC ......... *G06Q 20/363* (2013.01); *G06K 7/1413* (2013.01)

(58) Field of Classification Search
USPC .......................................................... 705/41
See application file for complete search history.

(56) References Cited

U.S. PATENT DOCUMENTS

2016/0006745 A1   1/2016   Furuichi et al.
2016/0239838 A1   8/2016   Yang et al.
(Continued)

FOREIGN PATENT DOCUMENTS

EP   2184722 A1 *   5/2010   ............. G06Q 20/32
EP   2184722 A1     5/2010
JP   2008-065574 A   3/2008
(Continued)

OTHER PUBLICATIONS

Authors: Sarwat Iqbal; Title: A Novel Mobile Wallet Model for Elderly Using Fingerprint as Authentication Factor; Publisher: IEEE; Date of Publication: Sep. 21, 2020; (Year: 2020).*
(Continued)

*Primary Examiner* — Bruce I Ebersman
*Assistant Examiner* — Hatem M Ali
(74) *Attorney, Agent, or Firm* — Oliff PLC

(57) ABSTRACT

A wallet server includes a processor with hardware. The processor is configured to acquire user information of user terminals carried by users who use a store, and configured to perform payment processing, and to generate group information when payment processing is performed by using a first user terminal. The group information is user information of the first user terminal and a second user terminal. The processor is configured to generate, from information on the payment processing and the group information, consumption information associated with each of the user terminals in a group.

2 Claims, 8 Drawing Sheets

(56) References Cited

U.S. PATENT DOCUMENTS

| | | | |
|---|---|---|---|
| 2019/0050863 A1* | 2/2019 | Agrawal | A61B 5/0245 |
| 2020/0265394 A1* | 8/2020 | Kubo | G06Q 20/065 |

FOREIGN PATENT DOCUMENTS

| | | | |
|---|---|---|---|
| JP | 2016-151785 A | | 8/2016 |
| JP | 2019-087023 A | | 6/2019 |
| JP | 2019-174943 A | | 10/2019 |
| JP | 2020-047184 A | | 3/2020 |
| KR | 10-2018-0113051 A | | 10/2018 |
| WO | WO-2016197872 A1 * | 12/2016 | G06Q 20/00 |

OTHER PUBLICATIONS

Authors: Julia Juremi; Title: Secure Integrated E-Wallet Mobile Application For Education Institution; Publisher: IEEE; Date of Conference: Jan. 29-31, 2021; Date Added to IEEE Xplore: Apr. 5, 2021 (Year: 2021).*

Authors: Sarwat Iqbal; Title: A Novel Mobile Wallet Model for Elderly Using Fingerprint as Authentication Factor; Publisher: IEEE; Date of Publication: Sep. 21, 2020; (Year: 2020) (Year: 2020).*

Authors: Julia Juremi; Title: Secure Integrated E-Wallet Mobile Application For Education Institution; Publisher: IEEE; Date of Conference: Jan. 29-31, 2021; Date Added to IEEE Xplore: Apr. 5, 2021 (Year: 2021) (Year: 2021).*

Authors: Yinzhi Cao et al; Title: Safe Pay: Protecting against credit card forgery with existing magnetic card readers; Published in: 2015 IEEE Conference on Communications and Network Security (CNS); (Year: 2015).*

Authors: Julia Juremi et al; Title: A Secure Integrated E-Wallet Mobile Application For Education Institution; Date Added to IEEE Xplore: Apr. 5, 2021; (Year: 2021).*

* cited by examiner

FIG. 8

| GROUP INFORMATION | | | CONSUMPTION INFORMATION | | |
|---|---|---|---|---|---|
| GROUP NO. | STORE ID | USER ID | PAYMENT AMOUNT | AMOUNT FOR EACH USER | PURCHASED ITEMS |
| 351 | AAA | ABC | ¥10,000 | ¥2,500 | FRIED FISH SET MEAL |
| | | DEF | - | ¥2,500 | STEAK SET MEAL |
| | | GHI | - | ¥2,500 | STEAK SET MEAL |
| | | JKL | - | ¥2,500 | SASHIMI RICE BOWL |
| 352 | BBB | ABC | ¥2,000 | ¥1,200 | TONKOTSU RAMEN |
| | | GHI | - | ¥800 | CHOW MEIN |
| 353 | CCC | DEF | ¥12,000 | ¥4,000 | PARTY PACKAGE A |
| | | JKL | - | ¥4,000 | PARTY PACKAGE A |
| | | MNO | - | ¥4,000 | PARTY PACKAGE A |
| ... | ... | ... | ... | ... | ... |
| | | ... | ... | ... | ... |
| | | ... | ... | ... | ... |

WALLET SERVER, WALLET SYSTEM, AND NON-TRANSITORY STORAGE MEDIUM

CROSS-REFERENCE TO RELATED APPLICATION

This application claims priority to Japanese Patent Application No. 2020-100081 filed on Jun. 9, 2020, incorporated herein by reference in its entirety.

BACKGROUND

1. Technical Field

The present disclosure relates to wallet servers, wallet systems, and non-transitory storage media.

2. Description of Related Art

Japanese Unexamined Patent Application Publication No. 2019-087023 (JP 2019-087023 A) discloses a technique in which, when making payment adjustment via a talk room between or among a plurality of terminals, a server sends a payment request for one terminal to the other terminals and manages payment methods and payment due dates for users associated with the other terminals.

SUMMARY

A technique is desired which can collect information on consumption behaviors of individual users even when one user in a group of a plurality of users made a payment for the group for an item or service provided to the group.

The present disclosure provides a wallet server, wallet system, and non-transitory storage medium that can collect information on consumption behaviors of individual users even when one user in a group of a plurality of users made a payment for the group for an item or service provided to the group.

A first aspect of the present disclosure is a wallet server. The wallet server includes a processor with hardware. The processor is configured to acquire user information of user terminals carried by users who use a store. The processor is configured to generate group information when payment processing is performed by using a first user terminal included in the user terminals. The group information is user information of the first user terminal and a second user terminal included in the user terminals. The processor is configured to generate, from information on the payment processing and the group information, consumption information associated with each of the user terminals in a group.

In the first aspect, the consumption information may be information on an amount of money allocated to each of the user terminals in the group and information on an item or service provided at the store, and the information on the amount of money allocated to each of the user terminals in the group and the information on the item or the service provided at the store may be associated with user-specific information that identifies each of the user terminals in the group.

In the first aspect, the processor may be configured to select the second user terminal that constitutes the group with the first user terminal from the user information of the user terminals. The processor may be configured to generate the group information that is the user information of the first user terminal and the second user terminal. The processor may be configured to associate a part of a payment amount in the payment processing to the second user terminal in the group and calculate an amount of money allocated to the second user terminal in the group. The processor may be configured to generate the consumption information in association with each of the user terminals in the group.

In the first aspect, the processor may be configured to select the second user terminal in the group based on location information acquired from the first user terminal and the second user terminal.

A second aspect of the present disclosure is a wallet system. The wallet system includes: a first device provided in a store and including a first processor with hardware; and a second device including a second processor with hardware. The first processor is configured to perform payment by processing using user terminals carried by users and is configured to output payment information regarding content of payment. The second processor is configured to acquire user information of the user terminals carried by the users who use the store, the user information being information output from the first device. The second processor is configured to generate group information when the payment processing is performed by using a first user terminal included in the user terminals, the group information being user information of the first user terminal and a second user terminal included in the user terminals. The second processor is configured to generate, from information on the payment processing and the group information, consumption information associated with each of the user terminals in a group.

In the second aspect, the consumption information may be information on an amount of money allocated to each of the user terminals in the group and information on an item or service provided at the store, and the information on the amount of money allocated to each of the user terminals in the group and the information on the item or the service provided at the store may be associated with user-specific information that identifies each of the user terminals in the group.

In the second aspect, the first device may be configured to output information on a payment amount in the payment processing and purchase information, and the purchase information may be information on an item or service provided to the users respectively carrying the user terminals in the group.

In the second aspect, the first device may be configured to output, in association with the purchase information, the user information of the user terminals configured to perform the payment processing.

In the second aspect, the second processor may be configured to select the second user terminal that constitutes the group with the first user terminal from the user information of the user terminals. The second processor may be configured to generate the group information that is the user information of the first user terminal and the second user terminal. The second processor may be configured to associate a part of a payment amount in the payment processing to the second user terminal in the group and calculate an amount of money allocated to the second user terminal in the group. The second processor may be configured to generate the consumption information in association with each of the user terminals in the group.

In the second aspect, the second processor may be configured to select the second user terminal in the group based on location information acquired from the first user terminal and the second user terminal.

In the second aspect, the second processor may be configured to acquire the user information based on communication among a radio beacon communication unit, the first user terminal, and the second user terminal. The radio beacon communication unit may be configured to send information to the first device, may be configured to receive information from the first device and, may be configured to communicate with the user terminals. The second processor may be configured to select the second user terminal in the group.

In the second aspect, the second processor may be configured to acquire from the first device the user information acquired by reading a barcode symbol displayed on the first user terminal and the second user terminal that is carried by a second user. The first device may be configured to read the barcode symbol. The second processor may be configured to select the second user in the group.

In the second aspect, the second processor may be configured to acquire the user information based on information acquired by reading a barcode symbol displayed on the first device. The first user terminal and the second user terminal that is carried by a second user may be configured to read the barcode symbol. The second processor may be configured to select the second user in the group.

A third aspect of the present disclosure is a non-transitory storage medium storing instructions that are executable by one or more processors with hardware and that cause the one or more processors to perform functions. The functions include: acquiring user information of user terminals carried by users who use a store, the user information being information output from a store terminal provided in the store and configured to perform payment processing; generating group information when the payment processing is performed by using a first user terminal included in the user terminals, the group information being user information of the first user terminal and a second user terminal included in the user terminals; and generating, from information on the payment processing and the group information, consumption information associated with each of the user terminals in a group.

According to the first aspect, the second aspect, and the third aspect of the present disclosure, information on consumption behaviors of individual users can be collected even when one user in a group of a plurality of users made a payment for the group for an item or service provided to the group.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 illustrates an example of the group information and consumption information generated by the wallet server of the embodiment.

DETAILED DESCRIPTION OF EMBODIMENTS

Figure 1:
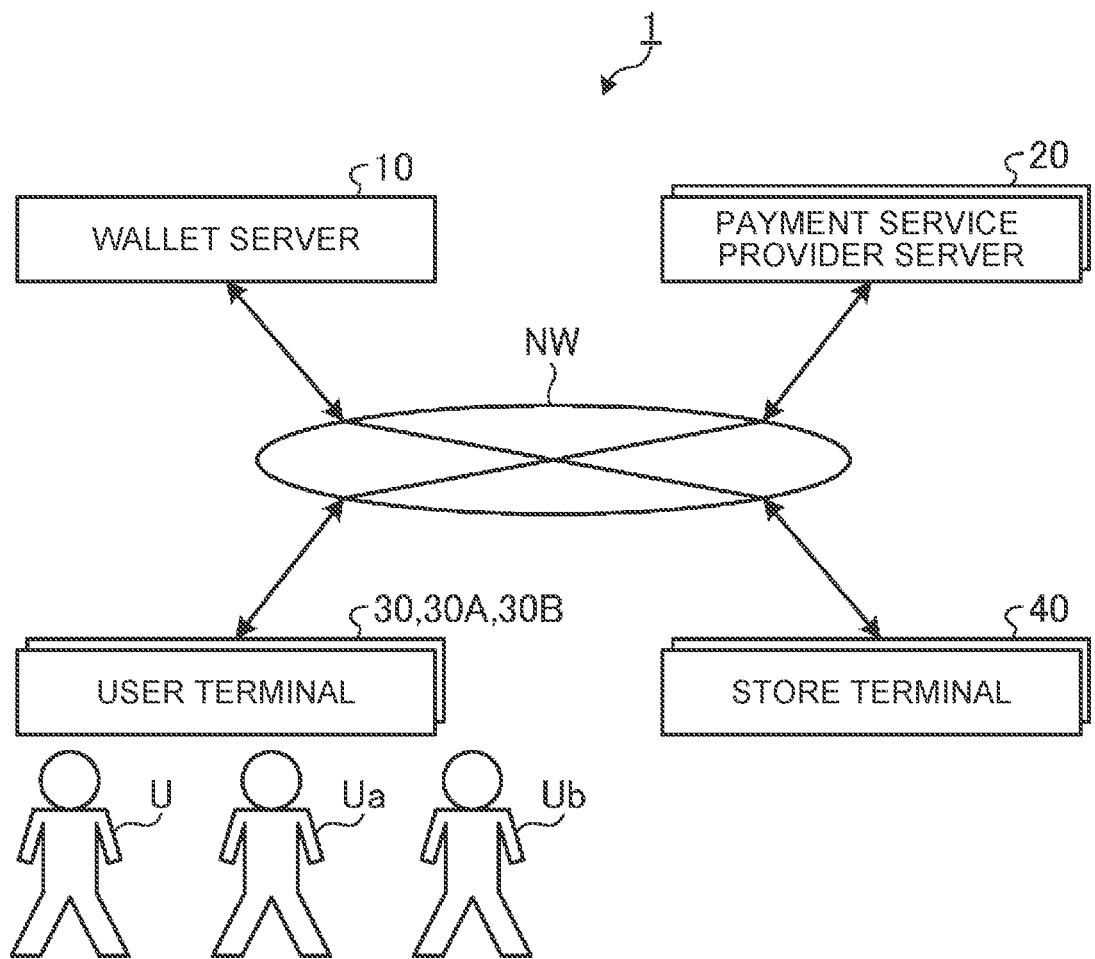
FIG. 1 schematically illustrates the configuration of a wallet system according to an embodiment.

Embodiments of the present disclosure will be described with reference to the accompanying drawings. In the drawings of the following embodiments, the same or corresponding portions are denoted with the same signs. The present disclosure is not limited to the following embodiments. Components of the following embodiments include components that can be easily replaced by those skilled in the art or components that are substantially the same.

Wallet System

The configuration of a wallet system according to an embodiment will be described. As shown in FIG. 1, a wallet system 1 includes a wallet server 10, a payment service provider server 20, a user terminal 30, and a store terminal 40.

The wallet server 10, the payment service provider server 20, the user terminal 30, and the store terminal 40 are configured so that they can communicate with each other via a network NW. The network NW is, e.g., an Internet network, a mobile phone network, etc. The network NW may include other communication networks such as a wide area network (WAN), a telephone network for mobile phones etc., and a wireless network like Wi-Fi (registered trademark).

Wallet Server

Figure 2:
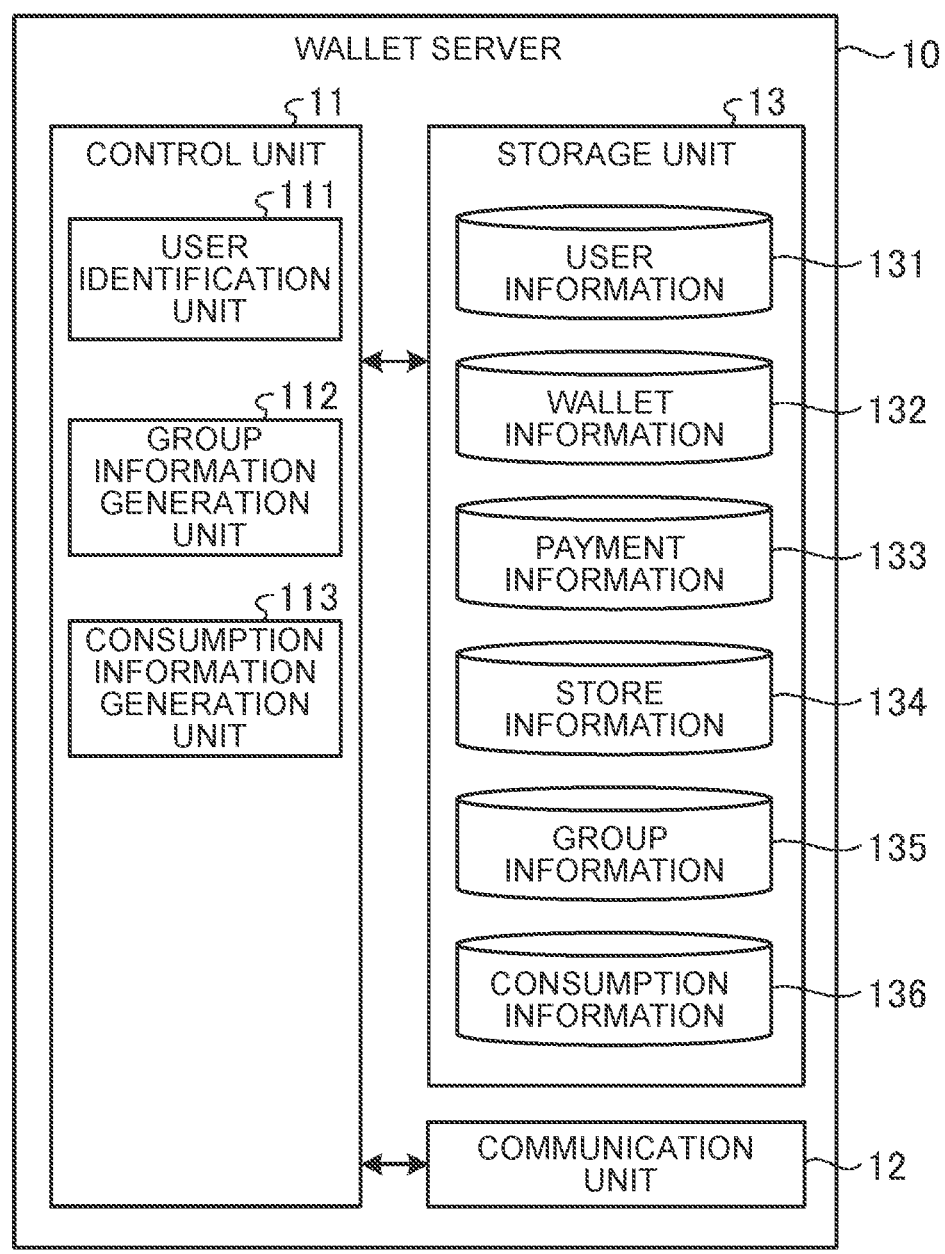
FIG. 2 is a block diagram schematically illustrating the configuration of a wallet server according to the embodiment.

The wallet server 10 that is a second device including a wallet server is a server that manages the overall wallet system according to the embodiment. An administrator of the wallet system manages the wallet server 10. As shown in FIG. 2, the wallet server 10 includes a control unit 11 that is a second processor, a communication unit 12, and a storage unit 13.

Specifically, the control unit 11 includes: a processor with hardware such as a central processing unit (CPU), a digital signal processor (DSP), or a field-programmable gate array (FPGA); and a main storage unit such as a random access memory (RAM) and a read only memory (ROM). The storage unit 13 is composed of a storage medium selected from an erasable programmable read only memory (EPROM), a hard disk drive (HDD), a removable medium, etc. The removable medium is, e.g., a universal serial bus (USB) memory or a disc recording medium such as a compact disc (CD), a digital versatile disc (DVD), or a Blu-ray (registered trademark) disc (BD). The storage unit 13 can store an operating system (OS), various programs, various tables, various databases, etc.

The control unit 11 loads and executes the programs stored in the storage unit 13 in a working area of the main storage unit and controls each constituent unit etc. by execution of the programs. The programs may be trained models generated by machine learning etc. The trained models can be generated by machine learning such as deep learning using a neural network by using input and output data sets of predetermined input parameters and output parameters as training data. The control unit 11 can thus implement functions of a user identification unit 111, a group information generation unit 112, and a consumption information generation unit 113. The functions of the user identification unit 111, the group information generation unit 112, and the consumption information generation unit 113 will be described in detail later.

The communication unit 12 that is an information acquiring unit is composed of, e.g., a local area neatwork (LAN) interface board, a wireless communication circuit for wireless communication, etc. The LAN interface board and the wireless communication circuit are connected to the network NW such as the Internet that is a public network. The communication unit 12 is connected to the network NW to communicate with the payment service provider server 20, the user terminal 30, and the store terminal 40.

The storage unit 13 is composed of a recording medium such as an erasable programmable read only memory (EPROM), a hard disk drive (HDD), or a removable medium. The removable medium is, e.g., a universal serial bus (USB) memory or a disc recording medium such as a compact disc (CD), a digital versatile disc (DVD), or a Blu-ray (registered trademark) disc (BD). The storage unit 13 can store an operating system (OS), various programs, various tables, various databases, etc. The storage unit 13 according to the embodiment has stored therein user information 131, wallet information 132, and payment information 133 for each user of the wallet system 1. The storage unit 13 has also stored therein store information 134, group information 135, and consumption information 136.

The user information 131 is information on the user of the wallet system 1. For example, the user information 131 is information on the user who has registered for the wallet system 1 such as user identification (ID), password, name, contact information (e.g., address, phone number, email address, etc.), registration history, information on payment means registered as deposit means, information on payment means registered as payment means, and personal identification number (PIN) that is used for payment. Of the user information 131, the user ID and the password are used for an authentication process such as login to the wallet server 10.

The wallet information 132 is information on a wallet of the wallet system 1. The wallet refers to a virtual deposit and withdrawal account for electronic money. The wallet information 132 is, e.g., a user ID, account balance, electronic money deposit history, electronic money usage history, etc.

The payment information 133 is information on payment of the wallet system 1. The payment information 133 is a user ID, payment means used for payment (e.g., electronic money payment (contactless payment), scan payment, code payment, etc.), date and time information including the date and time payment was made, payment history, etc.

The store information 134 is various store information on facilities and terminals of stores that use the wallet system 1. The store information 134 is, e.g., location information of facilities of stores such as various restaurants and cafeterias that provide food or services, information on the food, menus and services handled by the stores, information on business hours and days of the stores, information on coupons and promotions of the stores, etc.

The group information 135 includes information on a group of a plurality of users who have used the store. That is, the group information 135 includes user information that can distinguish the users grouped together from each other. The consumption information 136 includes information on items and amount of money consumed by each user, services received by each user, etc. The consumption information 136 includes information on consumption of each user associated with the group.

Payment Service Provider Server

Figure 3:
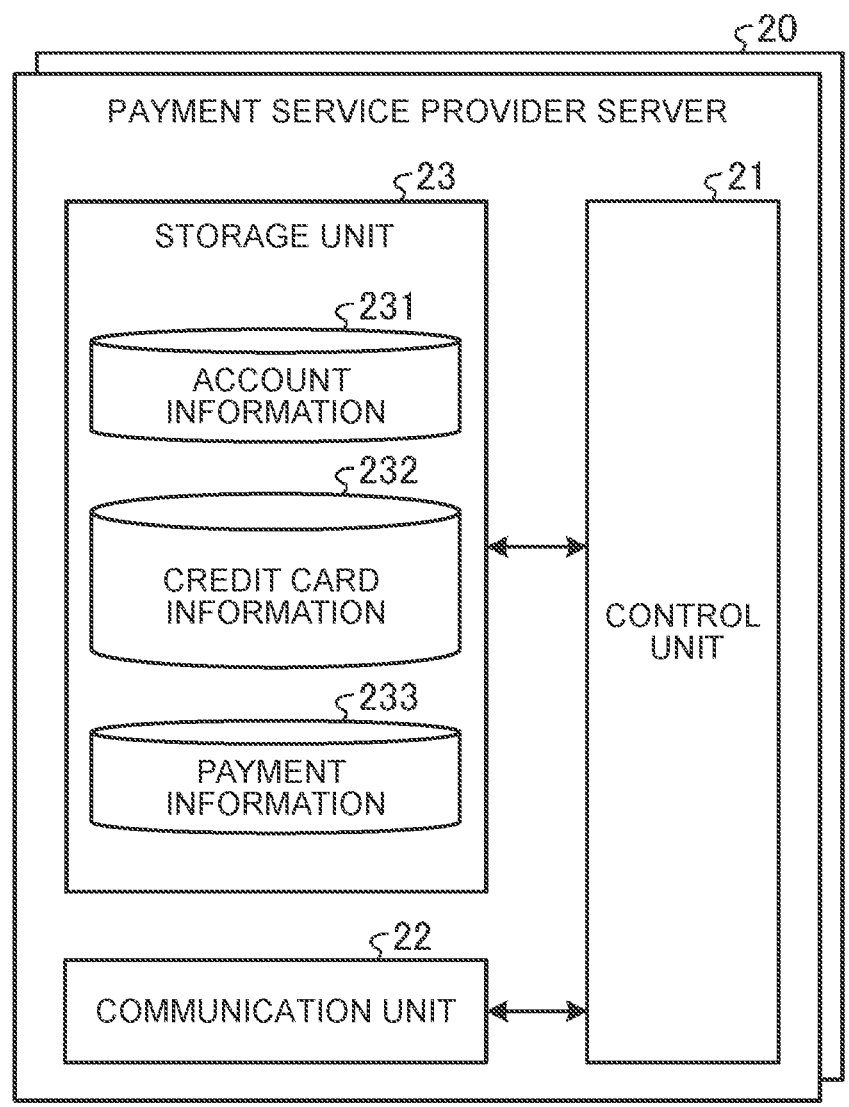
FIG. 3 is a block diagram schematically illustrating the configuration of a payment service provider server according to the embodiment.

The payment service provider server 20 is a server for managing users' accounts and credit cards. The payment service provider server 20 is provided in, e.g., a financial institution such as a bank, credit union, credit association, or labor bank, or a credit card company. As shown in FIG. 3, the payment service provider server 20 includes a control unit 21, a communication unit 22, and a storage unit 23. The control unit 21, the communication unit 22, and the storage unit 23 are functionally similar to the control unit 11, the communication unit 12, and the storage unit 13, respectively.

The storage unit 23 has stored therein account information 231, credit card information 232, and payment information 233 for each user of the wallet system 1. The account information 231 is, e.g., the user's name, account number, account balance, deposit and withdrawal history, etc. The credit card information 232 is, e.g., the user's name, credit card number, credit card expiration date, credit card credit line, credit card transaction history, etc. The payment information 233 is, e.g., a user ID, payment means, payment history, etc. The storage unit 23 may also have stored therein point information such as reward points offered by a payment service provider and promotion information that is information on various promotions. The point information is, e.g., the number of points etc. linked to the user's name, unique user ID, account information, or credit card information. The promotion information is, e.g., information on the reward points rate for a predetermined payment method, information on areas where promotions are offered, information on coupons that are provided to the user, etc.

User Terminal

The user terminal 30 is a computer terminal that is operated by the user. The user terminal 30 is, e.g., a smartphone, mobile phone, tablet terminal, wearable computer, personal computer owned by the user, a car navigation system mounted on a vehicle, etc. The user terminal 30 may be any terminal as long as it can send and receive information to and from the wallet server 10.

Figure 4:
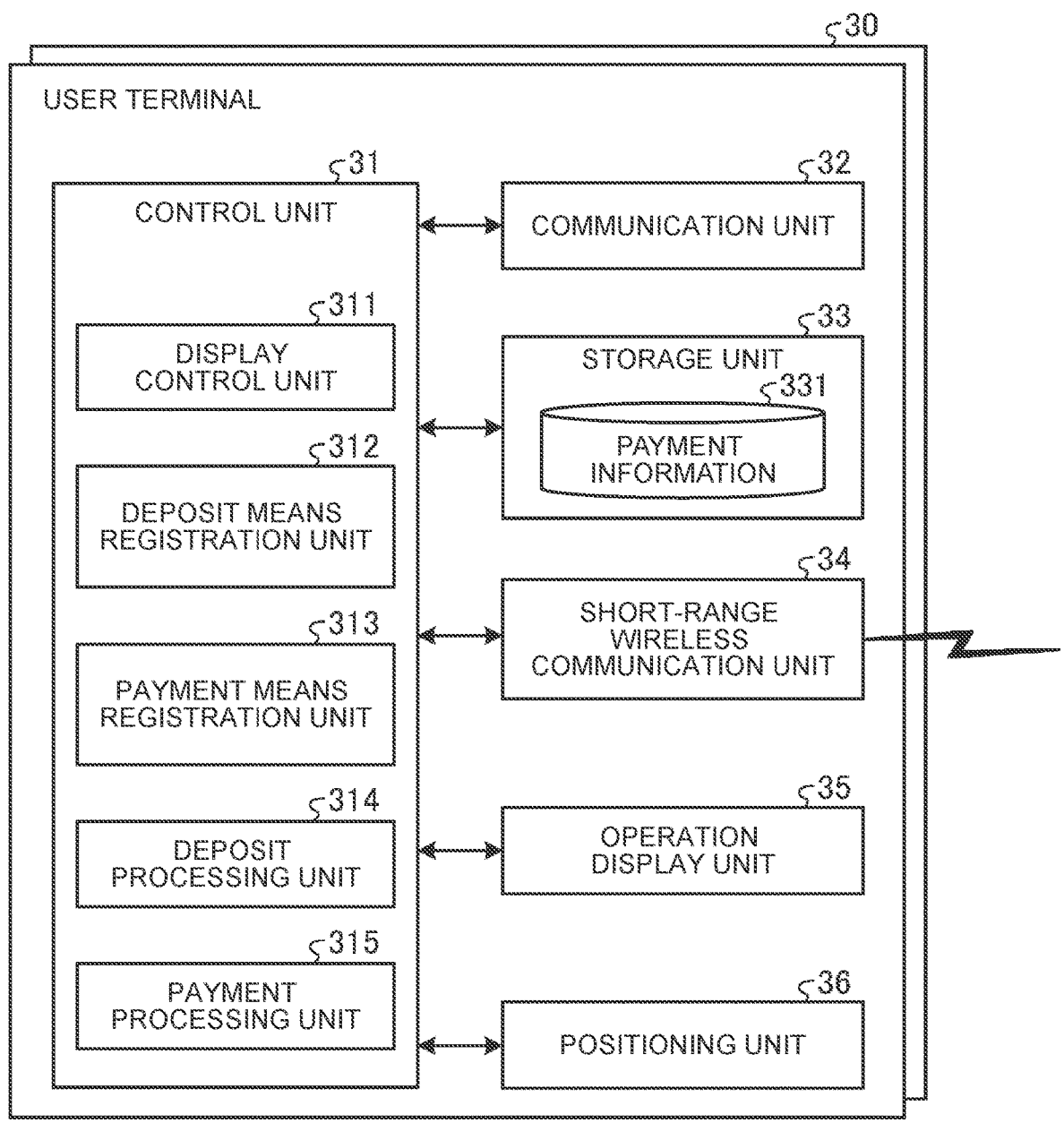
FIG. 4 is a block diagram schematically illustrating the configuration of a user terminal according to the embodiment.

As shown in FIG. 4, the user terminal 30 that is a third device includes a control unit 31, a communication unit 32, a storage unit 33, a short-range wireless communication unit 34, an operation display unit 35, and a positioning unit 36. The control unit 31, the communication unit 32, and the storage unit 33 are functionally similar to the control unit 11, the communication unit 12, and the storage unit 13 of the wallet server 10 shown in FIG. 2, respectively. As shown in FIG. 4, the control unit 31 that is a third processor functions as a display control unit 311, a deposit means registration unit 312, a payment means registration unit 313, a deposit processing unit 314, and a payment processing unit 315 through execution of programs.

The display control unit 311 controls what to display on the operation display unit 35 including a display. The display control unit 311 displays a member registration screen for the user to register as a member, a login screen for the user to log in to the wallet system 1, a deposit screen for the user to deposit electronic money into the wallet, a payment screen for the user to make a payment, etc. on the operation display unit 35 based on the user's operation such as touch operation or flick operation. The display control unit 311 switches the screen based on the user's operation.

The deposit means registration unit 312 registers deposit means for depositing electronic money. The deposit means registration unit 312 sends to the wallet server 10 a deposit means registration request to register a plurality of different payment methods operated by a plurality of business operators as means for depositing electronic money. Specific examples of the plurality of different payment methods operated by the plurality of business operators include a bank account, a credit card, etc. The control unit 11 of the wallet server 10 having received the deposit means registration request from the deposit means registration unit 312 stores the payment methods included in the deposit means registration request in the storage unit 13 as the user information 131 and thus registers the deposit means.

The payment means registration unit 313 registers various payment means. The payment means registration unit 313 sends to the wallet server 10 a payment means registration request to register payment means. The control unit 11 of the wallet server 10 having received the payment means registration request from the payment means registration unit 313 stores the payment methods included in the payment means registration request in the storage unit 13 as the user information 131 and thus registers the payment means. The payment methods may be registered instead of the payment means.

The deposit processing unit 314 deposits electronic money into the wallet. Specifically, the deposit processing unit 314 sends to the wallet server 10 a deposit request to deposit electronic money by the payment means registered as the deposit means. The control unit 11 of the wallet server 10 having received the deposit request from the deposit processing unit 314 increases the balance of electronic money in the wallet based on deposit amount information included in the deposit request. That is, the control unit 11 updates the wallet information 132 stored in the storage unit 13 according to the increase in balance of the electronic money in the wallet.

The payment processing unit 315 makes a payment by the payment method selected by the user. Specifically, the payment processing unit 315 sends a payment request as the payment means to the store terminal 40 through the short-range wireless communication unit 34. The payment processing unit 315 may send a payment request as the payment means to the store terminal 40 by reading a one-dimensional code (also referred to as a one-dimensional symbol) such as a barcode displayed on the store terminal 40 or a two-dimensional code (also referred to as a two-dimensional symbol) such as a quick response (QR) code (registered trademark) (hereinafter, the one-dimensional code and the two-dimensional code will be collectively referred to as a bar code symbol based on standards established by International Organization for Standardization (ISO)/International Electrotechnical Commission (IEC)) by a camera etc. of the user terminal 30. The payment processing unit 315 may send a payment request as the payment means to the store terminal 40 by causing a code displayed on the user terminal 30 to be read by a code reader etc. of the store terminal 40. The payment request that is sent from the payment processing unit 315 to the store terminal 40 may or may not include information indicating the payment amount (payment amount information).

In the case of a payment that is made using a bank account or a credit card, the payment processing unit 315 sends to the wallet server 10 a payment request to make a payment from the bank account or the credit card. The control unit 11 of the wallet server 10 having received the payment request from the payment processing unit 315 sends payment amount information included in the payment request to the payment service provider server 20.

In the case of a payment that is made using electronic money, the control unit 41 of the store terminal 40 that will be described later sends a payment request including payment amount information to the wallet server 10 via the network NW. The control unit 11 of the wallet server 10 having received the payment request from the store terminal 40 reduces the balance of electronic money in the wallet based on the payment amount information included in the payment request. That is, the control unit 11 updates the wallet information 132 and the payment information 133 stored in the storage unit 13 according to the reduction in balance of electronic money in the wallet.

The storage unit 33 has stored therein data of various screens to be displayed on the operation display unit 35 by the display control unit 311. The storage unit 33 temporarily stores the user information 131, the wallet information 132, and the payment information 133, the point information, etc. as needed. The storage unit 33 includes payment information 331 including various information stored when the user made a payment using the user terminal 30.

The short-range wireless communication unit 34 has a communication function according to a standard such as near field radio communication (NFC), Bluetooth (registered trademark) Low Energy (BLE), or Infrared Data Association (IrDA). The user terminal 30 performs short-range wireless communication with the store terminal 40 through the short-range wireless communication unit 34 when, e.g., making a payment using electronic money.

The operation display unit 35 is composed of, e.g., a touch panel display and has an input function to accept an operation performed with the user's finger, a pen, etc. and a display function to display various information as controlled by the display control unit 311.

The positioning unit 36 receives radio waves from a Global Positioning System (GPS) satellite and detects location information of the user terminal 30. The control unit 31 sends the location information of the user terminal 30 to the wallet server 10, the payment service provider server 20, or the store terminal 40 through the network NW.

Store Terminal

The store terminal 40 that is a first device is provided in a store 2 that is, e.g., a member store that can use the wallet system 1. The store terminal 40 may be a server that also functions as a virtual store on the Internet, namely an electronic commerce (EC) website.

Figure 5:
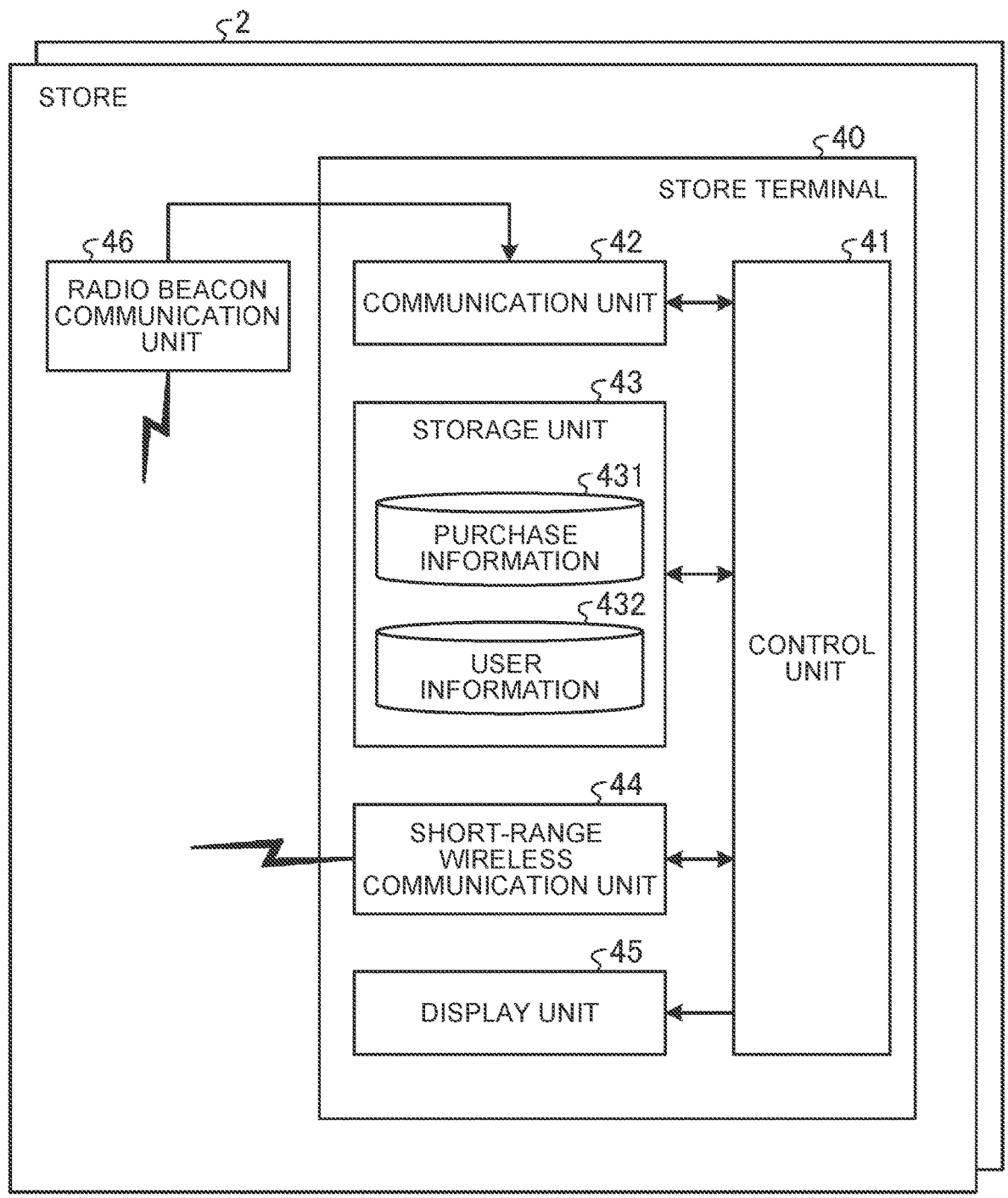
FIG. 5 is a block diagram schematically illustrating the configuration of a store terminal according to the embodiment.

As shown in FIG. 5, the store terminal 40 includes a control unit 41, a communication unit 42, a storage unit 43, a short-range wireless communication unit 44, and a display unit 45. The control unit 41 that is a first processor, the communication unit 42, the storage unit 43, and the short-range wireless communication unit 44 are functionally similar to the control unit 11, the communication unit 12, the storage unit 13, and the short-range wireless communication unit 34, respectively. The display unit 45 is composed of, e.g., a liquid crystal display (LCD), an organic electroluminescent display (OELD), etc. and displays information as controlled by the control unit 41. The storage unit 43 has stored therein purchase information 431 and user information 432. The purchase information 431 is various information regarding a thing(s) purchased by the user at the store 2, such as a purchased item(s), purchase price, and purchase date and time. The user information 432 is user information acquired by the store terminal 40 from the user terminal 30. The user information 432 may be associated with the purchase information 431.

The store 2 with the store terminal 40 may be provided with a radio beacon communication unit 46. The radio beacon communication unit 46 has a communication function with an infrared beacon (IR beacon) of a radio beacon technique using infrared rays and a proximity notification function capable of receiving a signal from the subject user terminal 30 and identifying the user terminal 30 according to a standard such as BLE.

Method for Collecting Consumption Trends by Wallet Server

Next, a method for collecting consumption trends by the wallet system 1 including the wallet server 10 according to the embodiment will be described. Although information is sent and received via the network NW, this will not be particularly mentioned in the following description. When information is sent and received between the wallet server 10, each payment service provider server 20, each user terminal 30, and each store terminal 40, the information is associated with identification information for identifying each payment service provider server 20, each user terminal 30, and each store terminal 40. However, this will not be particularly mentioned in the following description.

Figure 6:
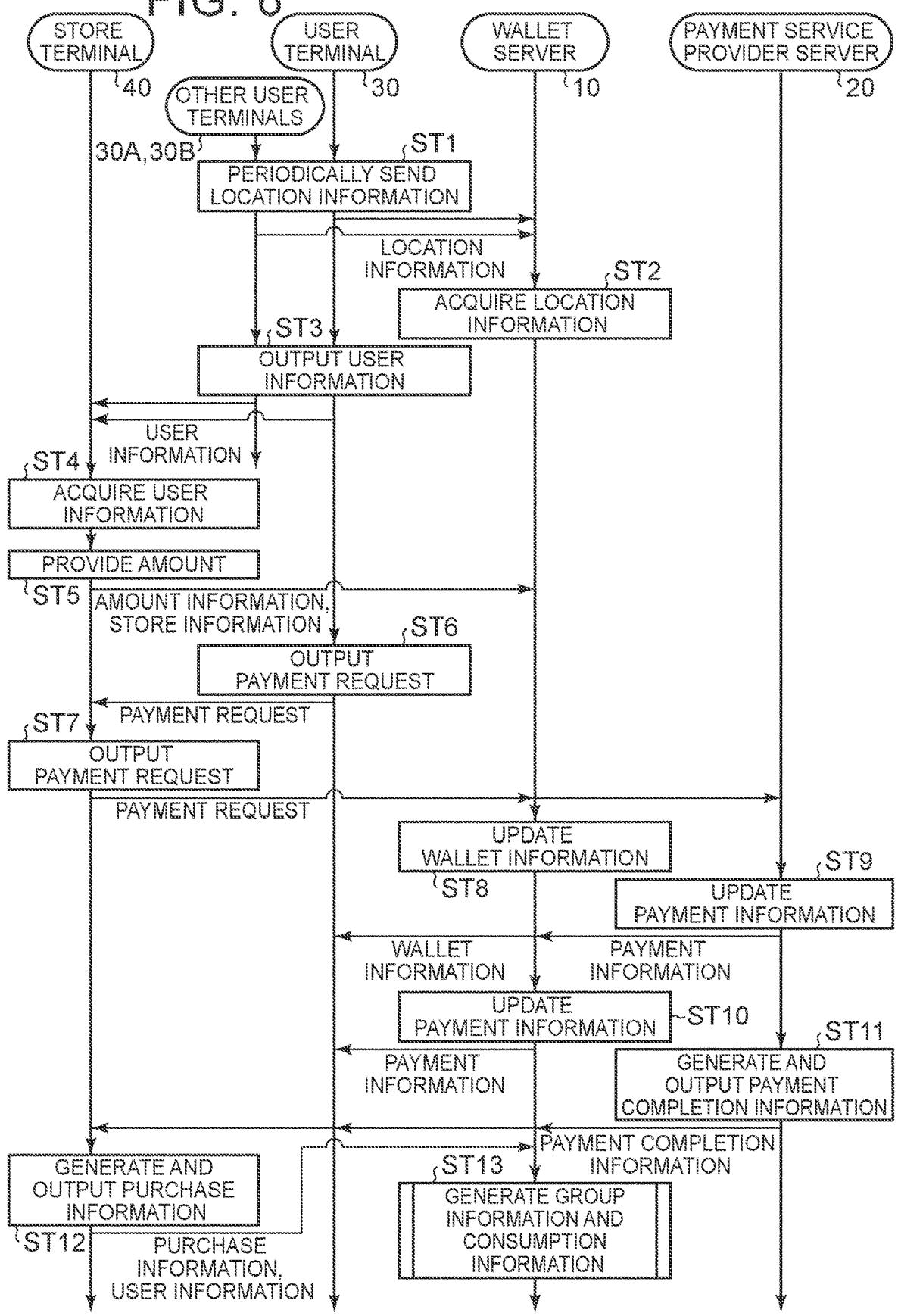
FIG. 6 is a flowchart of an example of a processing method of the wallet system of the embodiment.

As shown in FIG. 6, in step ST1, the user terminal 30 first sends its location information to the wallet server 10 periodically or as appropriate. User terminals 30A, 30B other than the user terminal 30 also send their location information to the wallet server 10 periodically or as appropriate. In step ST2, the control unit 11 of the wallet server 10 stores the received location information of the user terminals 30, 30A, 30B in the storage unit 13 as the user information 131. In the following description, it is assumed that the user terminals 30A, 30B are user terminals carried by users Ua, Ub who are not going to make a payment, and that the users Ua, Ub use the store 2 in a group with the user U who carries the user terminal 30. The number of users who act in a group with the user U who carries the user terminal 30 is not necessarily limited to two, and may be one or three or more.

In steps ST3, ST4, the store terminal 40 acquires from the user terminals 30, 30A, and 30B carried by the users U, Ua, and Ub visiting the store 2 the user information 432 that can identify the user terminals 30, 30A, and 30B, respectively. The store terminal 40 stores the acquired user information 432 in the storage unit 43. The following various methods can be used to acquire the user information 432.

For example, in step ST3, the user terminals 30, 30A, and 30B carried by the users U, Ua, and Ub communicate with the radio beacon communication unit 46 provided in the store 2. In step ST4, user information is output from the radio beacon communication unit 46 to the store terminal 40, so that the store terminal 40 can acquire the user information 432 including the user IDs that are user-specific information associated with the user terminals 30, 30A and 30B. In the case where the users U, Ua, and Ub are in a group, the user terminals 30, 30A, and 30B successively communicate with the radio beacon communication unit 46, and their communication times etc. are close to each other. Accordingly, the user information 432 acquired from the user terminals 30, 30A, and 30B can be associated with each other based on the communication times etc.

For example, the store terminal 40 can acquire the user information 432 in step ST4 by reading a barcode symbol such as a coupon displayed on the user terminals 30, 30A, and 30B by the code reader etc. of the store terminal 40 in step ST3. In the case where the users U, Ua, and Ub are in a group, the user terminals 30, 30A, and 30B are caused to display barcode symbols associated with each other or a common barcode symbol. Barcode symbols can be associated with each other by causing the short-range wireless communication units 34 of the user terminals 30, 30A, and 30B to communicate with each other. The user information 432 acquired from the user terminals 30, 30A, and 30B can thus be associated with each other.

For example, the store terminal 40 may be able to display a different barcode symbol on the display unit 45 every time the display is switched. In this case, the store terminal 40 can acquire the user information 432 in step ST4 by causing the same barcode symbol to be read by the cameras etc. of the user terminals 30, 30A, and 30B in the group in step ST3. In the case where the users U, Ua, and Ub are in a group, the barcode symbol read by the user terminals 30, 30A, and 30B is the same one-time barcode. The user information 432 acquired from the user terminals 30, 30A, 30B can thus be associated with each other.

The users U, Ua, and Ub who have entered the store 2 with the store terminal 40 eat, receive a predetermined service(s) from a store clerk, or hand an item(s) to a store clerk. In step ST5, the store clerk asks the user U of the user terminal 30 to make a payment using the store terminal 40. The user U pays the total amount of payments of the users U, Ua, and Ub for the users U, Ua, and Ub. The control unit 41 of the store terminal 40 displays the total amount on the display unit 45. The store terminal 40 sends information on the total amount and store information to the wallet server 10.

In step ST6, the payment processing unit 315 of the user terminal 30 outputs to the store terminal 40 a payment request to pay the payment amount determined in step ST5 by displaying electronic money deposited in the wallet, a predetermined code, etc. At this time, the payment processing unit 315 of the user terminal 30 may output the user information to the store terminal 40.

Subsequently, in step ST7, the control unit 41 outputs the payment request acquired from the user terminal 30 to the wallet server 10 and the payment service provider server 20. At this time, the control unit 41 may output the user information acquired from the user terminal 30 to the wallet server 10 and the payment service provider server 20. The payment request may be sent to either the wallet server 10 or the payment service provider server 20. The user information may be sent from the store terminal 40 to the wallet server 10 in response to a transmission request from the wallet server 10.

In step ST8, the control unit 11 of the wallet server 10 updates the wallet information 132 stored in the storage unit 13 according to the payment amount. In the case where the control unit 11 receives the user information, the control unit 11 may update the user information 131. The control unit 11 sends the updated wallet information 132 to the user terminal 30.

In step ST9, the control unit 21 of the payment service provider server 20 updates the payment information 233 stored in the storage unit 23 according to the payment amount. The payment service provider server 20 sends the updated payment information 233 to the wallet server 10.

In step ST10, the control unit 11 of the wallet server 10 updates the payment information 133 of the storage unit 23 according to the received payment information 233. The control unit 11 sends the updated payment information 133 to the user terminal 30.

Subsequently, in step ST11, the control unit 21 of the payment service provider server 20 sends payment completion information including information on completion of the payment processing to the wallet server 10, the user terminal 30, and the store terminal 40. All of steps ST8 to ST11 may be performed by the control unit 11 of the wallet server 10 or may be performed by the control unit 21 of the payment service provider server 20.

In step ST12, the control unit 41 of the store terminal 40 generates purchase information 431. Specifically, after receiving the payment completion information, the control unit 41 generates purchase information 431 including information on the item(s) and service(s) paid for by the user U using the user terminal 30, the payment amount, etc. For example, when the users U, Ua, and Ub ate at the store 2 and the user U made a payment for the users U, Ua, and Ub, the control unit 41 generates purchase information 431 including information on their order, information on the price of each item ordered, etc. The control unit 41 associates the generated purchase information 431 with the user information 432 acquired in step ST4 and sends them to the wallet server 10. The control unit 11 of the wallet server 10 includes the received purchase information 431 in the store information 134 and stores the resultant information in the storage unit 13. The control unit 11 of the wallet server 10 also stores the received user information 432 as the user information 131 in the storage unit 13.

Figure 7:
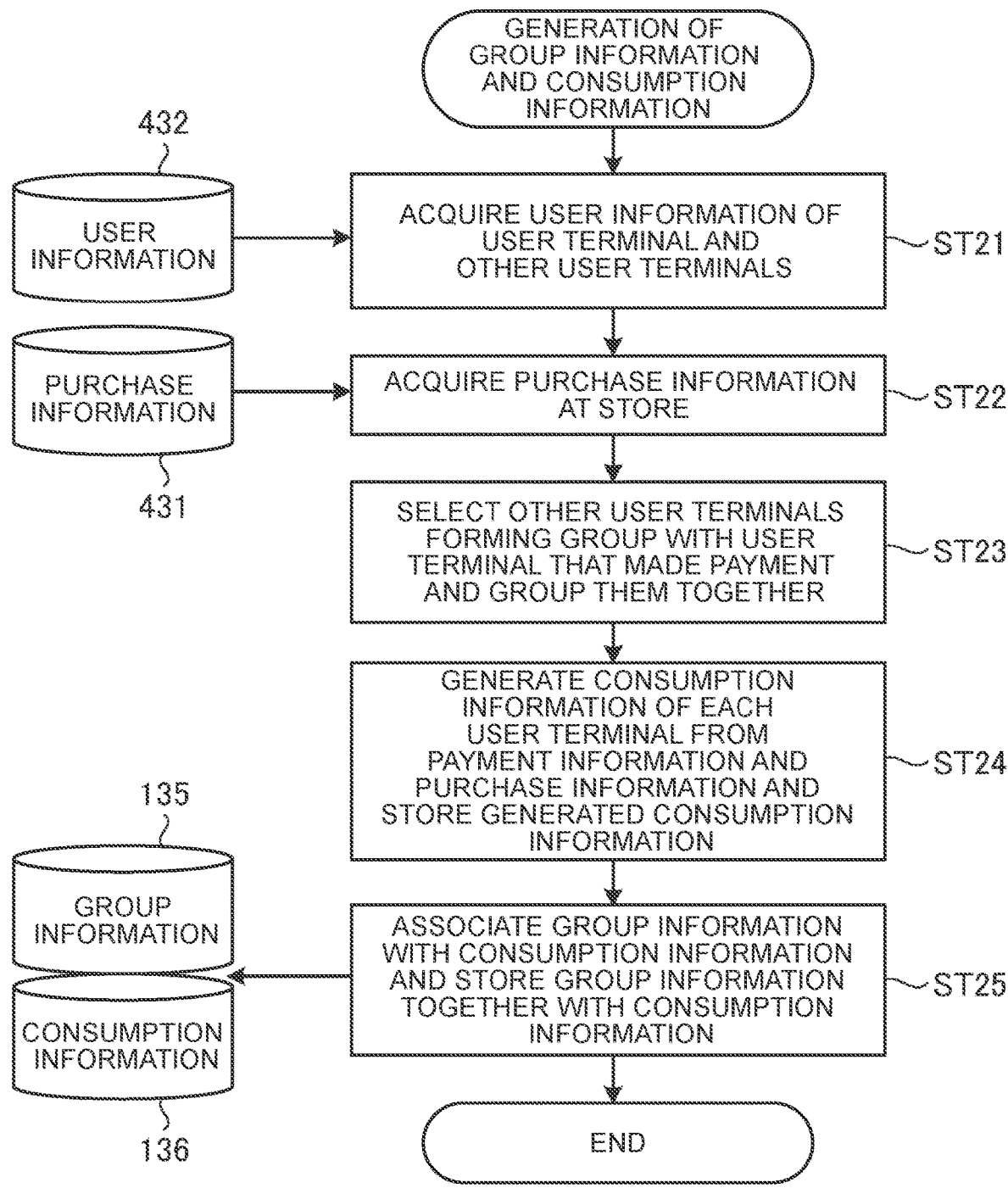
FIG. 7 is a flowchart of an example of a process of generating group information and consumption information by the wallet server of the embodiment.

In step ST13, the control unit 11 of the wallet server 10 generates group information 135 and consumption information 136. Specifically, as shown in FIG. 7, in step ST21, the user identification unit 111 of the control unit 11 first acquires from the storage unit 13 the user information 131 of the user terminal 30 carried by the user U and other user terminals 30A, 30B carried by the users Ua, Ub, respectively, out of a plurality of user terminals 30. The user identification unit 111 can thus acquire the user information 432 received from the store terminal 40. In step ST22, the user identification unit 111 reads from the storage unit 13 the purchase information 431 received from the store terminal 40 and thus acquires the purchase information 431.

Next, in step ST23, the group information generation unit 112 of the control unit 11 selects the user information 131 of the user terminal 30 of the user U who made the payment at the store 2 from the acquired user information 432 based on the purchase information 431. The group information generation unit 112 then retrieves the other user terminals that can be set as a group with the user terminal 30 of the user U, namely the user terminals 30A, 30B of the users Ua, Ub in this example, from the user information 131 based on the information included in the acquired user information 432. The information included in the user information 432 is, e.g., location information of the users U, Ua, and Ub at the time they used the store 2, information on the barcode symbol read by the user terminals 30, 30A, and 30B at the store 2, information on the barcode symbol(s) displayed on the user terminals 30, 30A, and 30B and read by the store terminal 40, etc. The group information generation unit 112 thus identifies the individual users U, Ua, and Ub who used the store 2 in a group and generates the group information 135.

As shown in FIG. 8, the group information 135 includes the store ID of the store 2 where the payment was made and the users ID included in the user information 131 of the users U, Ua, and Ub, and further includes a group number that is a number for identifying each group, etc. Instead of the group number, other symbol etc. may be used as long as it can identify each group in the group information 135.

Subsequently, in step ST24 shown in FIG. 7, the consumption information generation unit 113 of the wallet server 10 generates the consumption information 136 of each user U, Ua, and Ub based on the payment information 133 and the purchase information 431 included in the acquired store information 134. In step ST25, the control unit 11 then associates the consumption information 136 with the group information 135 generated as described above based on the user information 131 associated with the payment information 133 and the purchase information 431 and stores the consumption information 136 together with the group information 135 in the storage unit 13. A specific example of a method for generating the consumption information 136 associated with the group information 135 will be described with reference to FIG. 8.

Specifically, as shown in FIG. 8, a user U (user IDs: "DEF") of a group with a group number of "353" made a payment of, e.g., 12,000 yen at a store 2 with a store ID of "CCC." The consumption information generation unit 113 calculates the amount for each user, which is the split amount for the other users Ua, Ub (user IDs: "JKL", "MNO"), based on the payment amount of the payment processing performed by the user U. In the example shown in FIG. 8, the payment is evenly split among the three users U, Ua, and Ub. That is, each user U, Ua, Ub pays 4,000 yen (=12,000/3). In the case where the item purchased at the store 2, which is included in the purchase information 431, is an item that is consumed by the entire group such as "party package A," the amount for each user may be calculated by substantially evenly splitting the payment among the three users U, Ua, and Ub. The consumption information generation unit 113 can thus generate the consumption information 136 including information on the payment amount, the amount for each user, and the purchased item as information on the consumption trends of each user U, Ua, Ub. In the specification, the "purchased item" includes the content of a service received by a user.

For a group with a group number of "351," four users purchased different items at a store 2 with a store ID of "AAA." The user U (unique ID: "ABC") of this group made a payment of, e.g., 10,000 yen. In the case where the users in the group purchased different items and the purchase information 431 does not include information on the prices of the purchased items, the consumption information generation unit 113 allocates the purchased items included in the purchase information 431 to the four users and substantially evenly calculates the amount for each user. The consumption information generation unit 113 can thus generate the consumption information 136 including information on the payment amount, the amount for each user, and the purchased items as information on the consumption trends of each of the four users.

For a group with a group number of "352," two users purchased different items at a store 2 with a store ID of "BBB." The user U (unique ID: "ABC") of this group made a payment of, e.g., 2,000 yen. In the case where the users in the group purchased different items and the purchase information 431 includes information on the prices of the purchased items, the consumption information generation unit 113 first allocates the purchased items included in the purchase information 431 to the two users. The consumption information generation unit 113 also associates the prices of the purchased items included in the purchase information 431 with the purchased items and calculates the amount for each user. The consumption information generation unit 113 can thus generate the consumption information 136 including information on the payment amount, the amount for each user, and the purchased items as information on the consumption trends of each of the two users.

The consumption information 136 described above may be generated in the case where the payment amount paid using the user terminal 30 that performed the payment processing is a predetermined amount or more. The predetermined amount may be a preset amount or an amount that is set according to the number of people in the group. The preset amount is, e.g., a fixed amount such as 10,000 yen, etc. The amount that is set according to the number of people in the group is, e.g., a set amount per user in the group multiplied by the number of users in the group, etc.

In the case where a group of a plurality of users purchased items at a store 2 and one user in the group made a payment for the group with his or her user terminal 30 using the wallet system 1, it used to be difficult for the wallet server 10 to know the consumption trends of the other users in the group. According to the embodiment of the present disclosure described above, however, even when the payment is split among the users in the group without using the wallet system 1, information on the consumption behaviors of the individual users can be collected and more detailed consumption information on the consumption trends on an individual level can be collected.

Although the embodiment of the present disclosure is specifically described above, the present disclosure is not limited to the embodiment, and various modifications can be made based on the technical idea of the present disclosure. The present disclosure also includes configurations formed by combining the components according to the present disclosure as appropriate. Further effects and modifications can be readily derived by those skilled in the art. Accordingly, the broader aspects of the present disclosure are not limited to the embodiment and can be modified in various forms. For example, the evaluation screen provided in the embodiment is illustrated by way of example only, and a different evaluation screen may be used, as necessary. The present disclosure is not limited to the description and drawings that form a part of the present disclosure according to the embodiment.

Recording Medium

In the embodiment, the programs that can execute the processing methods by the wallet server 10, the payment service provider server 20, the user terminal 30, and the store terminal 40 can be recorded on a recording medium that can be read by a computer or other machine or device (hereinafter referred to as the computer etc.). The computer etc. functions as the control unit of the wallet server 10 or the user terminal 30 by reading and executing the programs recorded on the recording medium. As used herein, the recording medium that can be read by the computer etc. is a non-transitory recording medium that can store information such as data and programs by an electrical, magnetic, optical, mechanical, or chemical action and that can be read by the computer etc. Of the recording media that can be read by the computer etc., the recording media that are detachable from the computer etc. include, e.g., floppy disks, magneto-optical disks, a compact disc read only memory (CD-ROM), a compact disc rewritable (CD-R/W), digital versatile discs (DVDs), BDs, digital audio tapes (DATs), magnetic tapes, and memory cards such as flash memories, and the recording media that are fixed to the computer etc. include, e.g., hard disks and ROMs. Solid state drives (SSDs) can be used either as the recording media that are detachable from the computer etc. or as the recording media that are fixed to the computer etc.

Information Processing System

In another embodiment, the functions of each of the user identification unit 111, the group information generation unit 112, and the consumption information generation unit 113 may be divided and executed by a plurality of devices capable of communicating with each other via the network NW.

Other Embodiments

For the wallet server 10, the payment service provider server 20, the user terminal 30, and the store terminal 40 according to the embodiment, the term "unit" can be read as a "circuit" etc. For example, the communication unit can be read as a communication circuit.

The programs to be executed by the wallet server 10, the payment service provider server 20, the user terminal 30, and the store terminal 40 according to the embodiment may be configured to be stored in a computer connected to a network such as the Internet and provided by downloading via a network.

In the description of the flowcharts in the specification, the order of the steps is described using the terms such as "first," "then," and "subsequently." However, the order of the steps that are necessary to carry out the embodiment is not uniquely determined by these terms. That is, the order of the steps in each flowchart described in the specification can be changed as long as no inconsistency arises.

Further effects and modifications can be readily derived by those skilled in the art. The broader aspects of the present disclosure are not limited to the specific details and representative embodiments illustrated and described above. Therefore, various modifications can be made without departing from the spirit or scope of the general concept of the disclosure defined by the appended claims and their equivalents.

What is claimed is:

1. A wallet server comprising a processor with hardware, wherein
the processor is configured to:
acquire user information of a first user terminal carried by a first user and user information of a second user terminal carried by a second user, the user information of the first user terminal and the user information of the second user terminal comprising (i) location information acquired from the first user terminal and the second user terminal and (ii) barcode information read or displayed by the first user terminal and the second user terminal;
automatically determine that the second user is part of a group of the first user and the second user who both frequent a store at a given time, based on (i) the location information of the first user terminal and the location information of the second user terminal at the given time, and (ii) the barcode information read or displayed by the first user terminal and the second user terminal;
generate group information for the group when payment processing is performed by using the first user terminal, the group information comprising information identifying the first user terminal and the second user terminal;
generate, from information on the payment processing and the group information, consumption information associated with each of the user terminals in the group, the consumption information indicating an amount consumed at the store by each user; and
generate a table that includes the group information and the consumption information such that the group information and the consumption information correspond to each other in the table, the consumption information further comprising information on a payment amount made by the first user at the store,
wherein the consumption information includes information on an amount of money allocated to each of the user terminals in the group and information on an item or service provided at the store, and
wherein the information on the amount of money allocated to each of the user terminals in the group and the information on the item or the service provided at the store are associated with user-specific information that identifies each of the user terminals in the group, and
the processor is further configure to:
associate a part of a payment amount in the payment processing to the second user terminal in the group and calculating an amount of money allocated to the second user terminal in the group.

2. A non-transitory computer readable storage medium storing instructions that are executable by one or more processors with hardware and that cause the one or more processors to perform functions comprising:
acquiring user information of a first user terminal carried by a first user and user information of a second user terminal carried by a second user, the user information being information output from a store terminal provided in the store and configured to perform payment processing, the user information of the first user terminal and the user information of the second user terminal comprising (i) location information acquired from the first user terminal and the second user terminal and (ii) barcode information read or displayed by the first user terminal and the second user terminal;
automatically determining that the second user is part of a group of the first user and the second user who both frequent a store at a given time, based on (i) the location information of the first user terminal and the location information of the second user terminal at the given time and (ii) the barcode information;
generating group information for the group when the payment processing is performed by using the first user terminal, the group information comprising information identifying the first user terminal and the second user terminal;
generating, from information on the payment processing and the group information, consumption information associated with each of the user terminals in the group, the consumption information indicating an amount consumed at the store by each user; and
generating a table that includes the group information and the consumption information such that the group information and the consumption information correspond to each other in the table, the consumption information further comprising information on a payment amount made by the first user at the store,
wherein the consumption information includes information on an amount of money allocated to each of the user terminals in the group and information on an item or service provided at the store, and
wherein the information on the amount of money allocated to each of the user terminals in the group and the information on the item or the service provided at the store are associated with user-specific information that identifies each of the user terminals in the group, and
the functions further comprise:
associating a part of a payment amount in the payment processing to the second user terminal in the group and calculating an amount of money allocated to the second user terminal in the group.

* * * * *